(12) United States Patent
Chen

(10) Patent No.: US 8,306,770 B2
(45) Date of Patent: Nov. 6, 2012

(54) METHOD, SYSTEM AND TEST PLATFORM FOR TESTING OUTPUT OF ELECTRICAL DEVICE

(75) Inventor: Ping-Hung Chen, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 368 days.

(21) Appl. No.: 12/727,260

(22) Filed: Mar. 19, 2010

(65) Prior Publication Data

US 2011/0037857 A1  Feb. 17, 2011

(30) Foreign Application Priority Data

Aug. 11, 2009  (TW) .............................. 98127016 A

(51) Int. Cl.
*G01R 31/00* (2006.01)
*G01R 23/16* (2006.01)

(52) U.S. Cl. ........... 702/117; 324/114; 375/226; 702/76

(58) Field of Classification Search .................... 702/76, 702/108, 109, 117–123; 324/73.1, 114; 348/180; 714/724, 736; 375/226

See application file for complete search history.

(56) References Cited

U.S. PATENT DOCUMENTS

| | | | | |
|---|---|---|---|---|
| 4,646,299 | A * | 2/1987 | Schinabeck et al. | 714/736 |
| 5,307,284 | A * | 4/1994 | Brunfeldt et al. | 702/76 |
| 5,969,835 | A * | 10/1999 | Kamieniecki et al. | 398/33 |
| 6,324,485 | B1 * | 11/2001 | Ellis | 702/117 |
| 6,538,420 | B2 * | 3/2003 | Bald et al. | 324/114 |
| 7,315,574 | B2 * | 1/2008 | Hafed et al. | 375/226 |

FOREIGN PATENT DOCUMENTS

| | | |
|---|---|---|
| CN | 1641593 A | 7/2005 |
| CN | 101640812 A | 2/2010 |

* cited by examiner

*Primary Examiner* — John H Le
(74) *Attorney, Agent, or Firm* — CKC & Partners Co., Ltd.

(57) ABSTRACT

A method for testing output of an electrical device includes the following steps: a device being tested transmits a first signal to a test platform through a channel being tested. A signal received through the channel being tested by the test platform is compared with the first signal to determine if the received signal corresponds to the first signal. The channel being tested is determined to be normal if the received signal corresponds to the first signal. The channel being tested is determined to be abnormal if the received signal does not correspond to the first signal.

15 Claims, 2 Drawing Sheets

METHOD, SYSTEM AND TEST PLATFORM FOR TESTING OUTPUT OF ELECTRICAL DEVICE

RELATED APPLICATIONS

This application claims priority to Taiwan Application Serial Number 98127016, filed Aug. 11, 2009, which is herein incorporated by reference.

BACKGROUND

1. Technical Field

The present disclosure relates to a method, system and test platform for testing. More particularly, the present disclosure relates to a method, system and test platform for testing output of an electrical device.

2. Description of Related Art

A Video Graphics Array (VGA) is an analog computer display standard, which is common to most video cards, computer monitors, and high definition television sets that support VGA-connector devices. Since traditional display devices only support analog signals, computer video cards must convert images utilizing digital formats into images utilizing analog format to be shown on traditional display devices. However, conversion thereof may cause image distortion.

Hence, the Digital Visual Interface (DVI) was developed. DVI is a video interface standard designed to provide very high visual quality on digital display devices such as flat panel LCD computer displays and digital projectors. As the display size of display devices increases, there is a need to show high quality images, on large-sized display devices. However, file sizes of high quality images are large, and the DVI bandwidth is not large enough to transmit high quality images, which limits display quality of display devices utilizing DVI.

Thus, the High-Definition Multimedia Interface (HDMI) was developed. HDMI is a compact audio/video interface for transmitting uncompressed digital data. HDMI connects digital audio/video sources—such as set-top boxes, Blu-ray Disc players, personal computers (PCs), video game consoles (such as the PlayStation 3 and Xbox 360), and AV receivers—to compatible digital audio devices, computer monitors, and digital televisions.

Above all, there are always new audio or video standards developed. Therefore, audio/video devices with several audio/video transmission interfaces are provided. To test audio/video transmission interfaces of audio/video devices thereof, audio/video devices are electrically connected with display devices through audio/video transmission interfaces, and transmit test images to the display devices through audio/video transmission interfaces. Then, quality engineers check test images displayed on the display devices, which costs time and needs lots of people.

SUMMARY

A method for testing output of an electrical device is provided. According to one embodiment of this invention, the method for testing output of an electrical device includes the following steps: a device being tested transmits a first signal to a test platform through a channel being tested. A signal received through the channel being tested by the test platform is compared with the first signal to determine if the received signal corresponds to the first signal. The channel being tested is determined to be normal if the received signal corresponds to the first signal. The channel being tested is determined to be abnormal if the received signal does not correspond to the first signal.

A system for testing output of an electrical device is provided. According to another embodiment of this invention, the system for testing output of an electrical device includes a channel being tested, a device being tested and a test platform. The device being tested includes at least a first transmission interface, electrically connected with the channel being tested and transmitting a first signal to the channel being tested. The test platform includes at least a second transmission interface and a processing module. The second transmission interface is electrically connected with the channel being tested and can receive a signal from the channel being tested. The processing module is electrically connected with the second transmission interface and can determine if the first transmission interface is normal by comparing the first signal with the signal received through the second transmission interface. Wherein, the processing module determines that the first transmission interface is normal if the first signal is the same as the signal received through the second transmission interface.

A test platform for testing output of an electrical device is provided. According to another embodiment of this invention, the test platform for testing output of an electrical device includes several transmission interfaces, a selection module and a processing module. The transmission interfaces can be electrically connected with a device being tested through several available channels respectively. The selection module can receive selection information for selecting one of the transmission interfaces. The available channel, which is electrically connected with the selected transmission interface, is taken as a channel being tested. The device being tested transmits a first signal through the channel being tested to the selected transmission interface. The processing module is electrically connected with the transmission interfaces. The processing module can receive a signal through the selected transmission interface and determine if the selected transmission interface is normal by comparing the first signal with the signal received through the selected transmission interface. Wherein, the selected transmission interface is determined to be normal if the first signal is the same as the signal received through the selected transmission interface.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
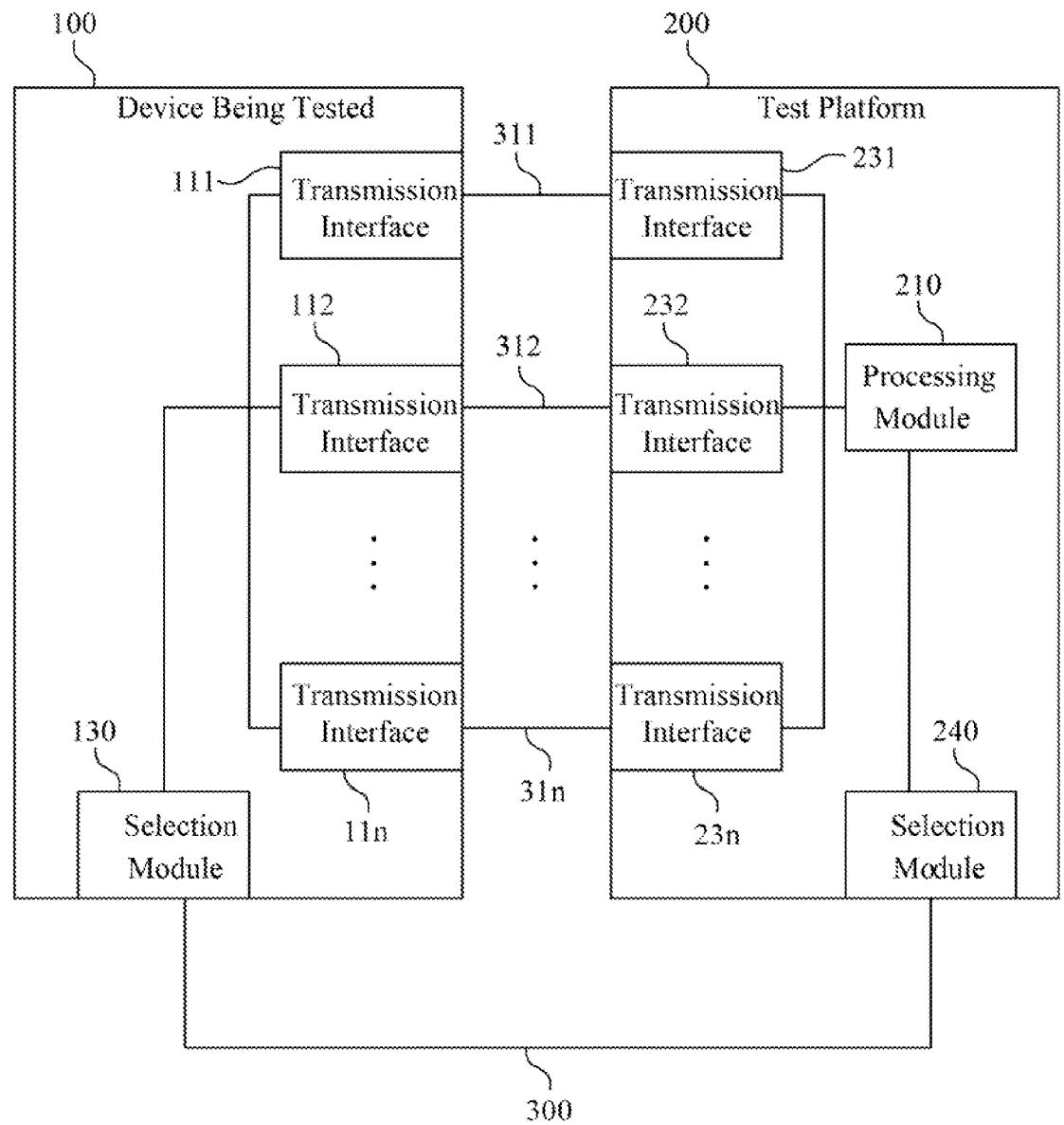
FIG. 1 is a block diagram of a system for testing output of an electrical device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a system for testing output of an electrical device according to one embodiment of this invention. In the system for testing output of an electrical device, a device being tested transmits a signal through a channel being tested, and a test platform receives a signal through the channel being tested and determines if the channel being tested is normal by comparing the received signal with the transmitted signal. Wherein, the channel being tested is determined to be normal if the received signal corresponds to the transmitted signal.

The system for testing output of an electrical device includes a device being tested 100, a test platform 200 for testing output of an electrical device and a channel being tested 311. The device being tested 100 includes a transmission interface 111, and the test platform includes a transmission interface 231 and a processing module 210. The transmission interface 111 of the device being tested 100 can be electrically connected with the transmission interface 231 of the test platform 200 through the channel being tested 311.

In addition, the device being tested 100 may include more transmission interfaces 112, . . . and 11n, the test platform 200 may include more transmission interfaces 232, . . . and 23n, and the system for testing output of an electrical device may include several available channels 311, 312, . . . and 31n, wherein the available channels 311, 312, . . . and 31n are candidates of the channel being tested. The transmission interface 111,112, . . . and 11n of the device being tested 100 can be electrically connected with the transmission interface 231, 232, . . . and 23n of the test platform 200 through the available channels 311, 312, . . . and 31n respectively. The available channels 311, 312, . . . and 31n may be audio channels, video channels, audio/video channels or combination thereof. More particularly, the available channels 311, 312, . . . and 31n may utilize High-Definition Multimedia Interface (HDMI), Digital Visual Interface (DVI), Separate Video (S-video), composite video, component video, Video Graphics Array (VGA), stereophonic sound (stereo) or any other audio or video standards. In addition, the amount of the transmission interfaces of the device being tested 100 and that of the test platform 200 may not be the same in other embodiments.

Then, the system for testing output of an electrical device may select one of the available channels to be tested. Therefore, the system for testing output of an electrical device may include a selection interface 300, the device being tested 100 may include a selection module 130, and the test platform 200 may also include a selection module 240. The selection interface 300 is electrically connected with the selection module 130 of the device being tested 100 and the selection module 240 of the test platform 200, such that the selection module 130 is electrically connected with the selection module 240 through the selection interface 300. The selection interface 300 may utilize Recommended Standard 232 (RS-232) or any other data transmission standard.

The selection module 130 of the device being tested 100 may select one of the transmission interfaces 111, 112, . . . and 11n. For example, the selection module 130 selects the transmission interface 111 in this embodiment. Therefore, the device being tested 100 takes the available channel 311, which is electrically connected with the selected transmission interface 111, as the channel being tested 311. Then, the selection module 130 may transmit a message related tot the selection through the selection interface 300.

The selection module 240 of the test platform 200 selects the transmission interface 231 corresponding to the selected transmission interface 111 according to the message received through the selection interface 300. In one embodiment, the message received through the selection interface 300 may include selection information of the selected transmission interface 111, such as information of the audio or video standard utilized by the selected transmission interface 111 or identification information of the selected transmission interface 111. Therefore, the transmission interface 231 corresponding to the selected transmission interface 111 may be selected. In another embodiment, the message received through the selection interface 300 may include the information of the channel being tested 311, such that the selection module 240 selects the transmission interface 231 corresponding to the channel being tested 311. In other embodiments, the message received through the selection interface 300 may include other selection related information for the selection module 240 selecting the transmission interface 231 from the transmission interfaces 231, 232, . . . and 23n of the test platform 200. Then, the test platform 200 also takes the available channel 311, which is electrically connected with the selected transmission interface 231, as the channel being tested 311. Moreover, in other embodiments, the selection module 240 of the test platform 200 may select the transmission interface first, such that the selection module 130 of the device being tested 100 selects the transmission interface corresponding to the one selected by the selection module 240.

After the transmission interface 111 is selected, the selected transmission interface 111 transmits a first signal to the channel being tested 311. The first signal may be converted for transmitting to the channel being tested 311 according to the standard utilized by the selected transmission interface 111. For example, if the channel being tested 311 utilizes HDMI, the selected transmission interface 111 may convert the first signal into a signal supporting HDMI. In other embodiments, the conversion may differ as the channel being tested 311 utilizes different audio or video standards. In addition, the selected transmission interface 111 may include several pins, and the first signal, which can be transmitted through the pins to the channel being tested 311 respectively, may be utilized to test the pins of the selected transmission interface 111 respectively.

The selected transmission interface 231 receives a signal from the channel being tested 311. The processing module 210 determines if the selected transmission interface 111 is normal by comparing the first signal with the signal received through the selected transmission interface 231. If the first signal is the same as the signal received through the selected transmission interface 231, the processing module 210 determines that the selected transmission interface 111 is normal. The processing module 210 may be implemented utilizing a Deinterlacer/Scaler since a Deinterlacer/Scaler can process audio or video signals. In other embodiments, other processing unit may be utilized to implement the processing module 210.

Figure 2:
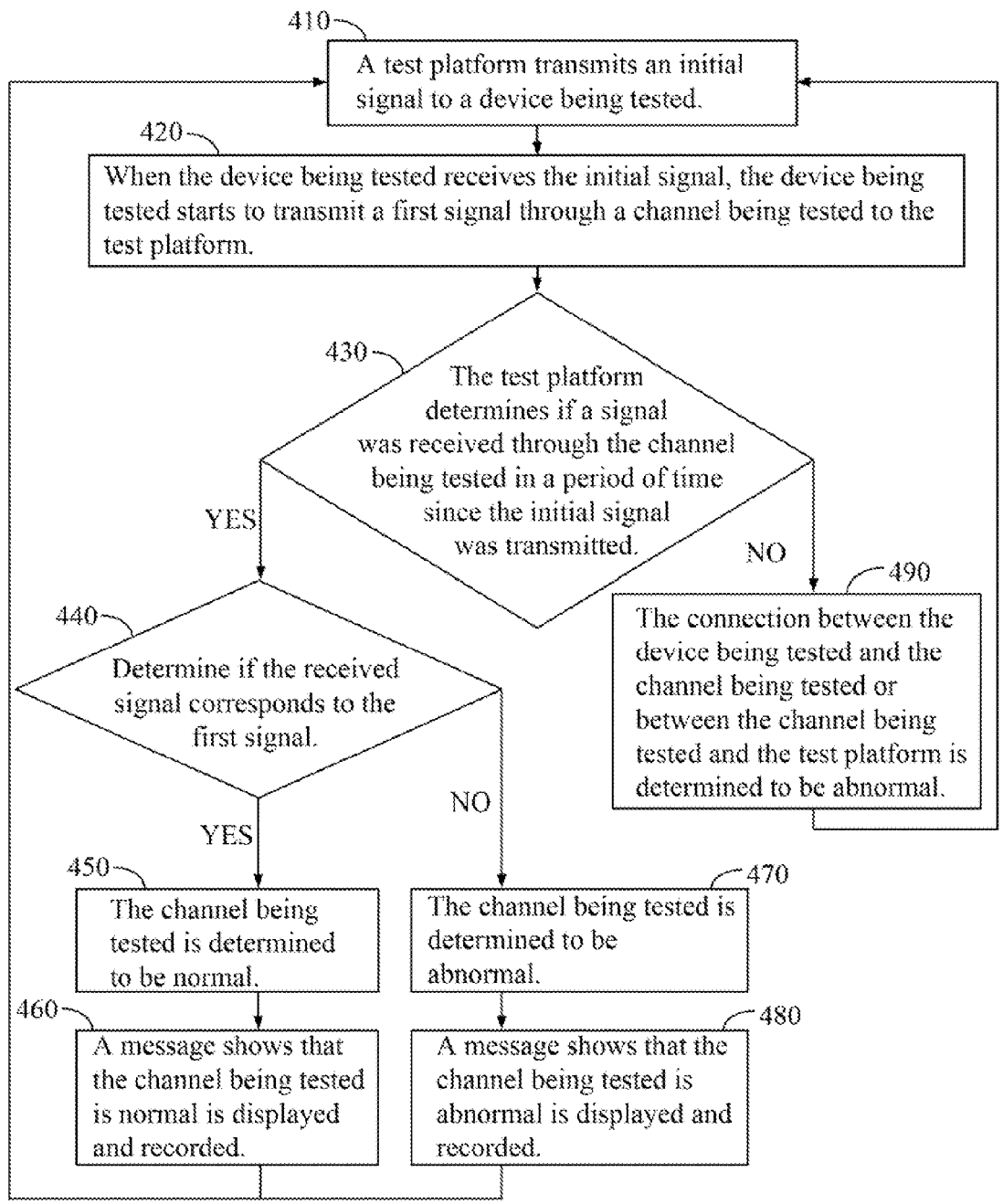
FIG. 2 is a flow diagram of a method for testing output of an electrical device according to another embodiment of this invention.

FIG. 2 is a flow diagram of a method for testing output of an electrical device according to another embodiment of this invention. In the method for testing output of an electrical device, a device being tested transmits signal through a channel being tested, and a test platform receives a signal through the channel being tested and determines if the channel being tested is normal by comparing the received signal with the transmitted. Wherein the channel being tested is determined to be normal if the received signal corresponds to the transmitted signal.

The method for testing output of an electrical device 400 includes the following steps:

In step 410, a test platform transmits an initial signal to a device being tested. In step 420, when the device being tested receives the initial signal, the device being tested starts to transmit a first signal through a channel being tested to the test platform. If there are several available channels, which are electrically connected with the device being tested and the test platform, the test platform may select one of the available channels to be the channel being tested, add information of the selected available channel to the initial signal, and transmit the added initial signal to the device being tested (step 410). Therefore, the device being tested transmits the first signal through the selected available channels to the test platform (step 420) according to the added initial signal. The available channels or the channel being tested may be audio channels, video channels, audio/video channels or combination thereof. More particularly, the available channels or the channel being tested may utilize HDMI, DVI, S-video, composite video, component video, VGA, stereo or any other audio or video standards. In addition, before the first signal is transmitted (step 420), the first signal may be converted to fit the standard utilized by the selected transmission interface.

Moreover, before step 420, a confirm request may be transmitted to the device being tested to obtain a confirm reply from the device being tested through the channel being tested. If the confirm reply is obtained, the channel being tested is determined enabled, such that the test platform prepares to receive the signal through the channel being tested from the device being tested.

In step 430, the test platform determines if a signal was received through the channel being tested in a period of time since the initial signal was transmitted (step 410). In step 490, if the test platform determines that no signal was received through the channel being tested by the test platform in the period of time since the initial signal was transmitted (step 410), the connection between the device being tested and the channel being tested or between the channel being tested and the test platform is determined to be abnormal. Then, the test platform transmits another initial signal to the device being tested (step 410) to test another channel. Therefore, after step 490, users can find the reason for the abnormal connection by checking the connection between the device being tested and the channel being tested or between the channel being tested and the test platform.

In step 440, if the test platform determines that at least a signal was received through the channel being tested by the test platform in the period of time since the initial signal was transmitted, determine if the received signal corresponds to the first signal. In one embodiment, the signal received through the channel being tested by the test platform may be compared with the first signal for the determination of step 440. If the received signal is the same as the first signal, the received signal, is determined to correspond to the first signal. If the received signal differs from the first signal, the received signal is determined to not correspond to the first signal. In other embodiments, other methods can be utilized to determine if the received signal corresponds to the first signal (step 440).

In step 450, if the received signal corresponds to the first signal, the channel being tested is determined to be normal. Then, a message shows that the channel being tested is normal is displayed and recorded (step 460), and the test platform transmits another initial signal to the device being tested (step 410) to test another channel.

In step 470, if the received signal does not correspond to the first signal, the channel being tested is determined to be abnormal. Then, a message shows that the channel being tested is abnormal is displayed and recorded (step 480), and the test platform transmits another initial signal to the device being tested (step 410) to test another channel.

Above all, after several transmission interfaces of a device being tested are electrically connected with the corresponding transmission interfaces of the test platform, the transmission interfaces of the device being tested can be tested respectively. If the device being tested is an audio or video device, there is no need to buy different display devices with different transmission interfaces for test, which can save money. Moreover, people for checking sounds or images, generated by the audio or video device being tested, are not needed.

Although the present invention has been described in considerable detail with reference to certain embodiments thereof, other embodiments are possible. Therefore, their spirit and scope of the appended claims should no be limited to the description of the embodiments container herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for testing output of an electrical device, comprising:
    making a device being tested transmitting a first signal to a test platform through a channel being tested;
    comparing a signal received through the channel being tested by the test platform with the first signal to determine if the received signal corresponds to the first signal;
    determining that the channel being tested is normal when the received signal corresponds to the first signal;
    determining that the channel being tested is abnormal when the received signal does not correspond to the first signal;
    making the test platform transmitting an initial signal to the device being tested, such that the device being tested starts to transmit the first signal to the test platform through the channel being tested; and
    when no signal was received through the channel being tested by the test platform in a period of time since the initial signal was transmitted, determining that connection between the device being tested and the channel being tested or connection between the channel being tested and the test platform is abnormal.

2. The method for testing output of the electrical device of claim 1, further comprising:
    transmitting a confirm request to the device being tested to obtain a confirm reply from the device being tested through the channel being tested;
    if the confirm reply is obtained, determining that the channel being tested is enabled, such that the test platform prepares to receive the signal through the channel being tested from the device being tested.

3. The method for testing output of the electrical device of claim 1, wherein there are several available channels, and the output test method for the electrical device further comprises:
    selecting the channel being tested from the available channels.

4. The method for testing output of the electrical device of claim 1, wherein the channel being tested is an audio channel, a video channel or an audio/video channel.

5. A system for testing output of an electrical device, comprising:
  a channel being tested;
  a device being tested, comprising:
    at least a first transmission interface, electrically connected with the channel being tested and transmitting a first signal to the channel being tested; and
  a test platform, comprising:
    at least a second transmission interface, electrically connected with the channel being tested and receiving a signal from the channel being tested; and
  a processing module, electrically connected with the second transmission interface and determining if the first transmission interface is normal by comparing the first signal with the signal received through the second transmission interface, wherein the first transmission interface is determined to be normal when the first signal is the same as the signal received through the second transmission interface,
  wherein the test platform transmits an initial signal to the device being tested, such that the device being tested starts to transmit the first signal to the test platform through the channel being tested,
  wherein when no signal was received through the channel being tested by the test platform in a period of time since the initial signal was transmitted, the test platform determines that connection between the device being tested and the channel being tested connection between the channel being tested and the test platform is abnormal.

6. The system for testing output of the electrical device of claim 5, wherein the first transmission interface comprises a plurality of pins, and the first signal is transmitted through the pins to the channel being tested respectively.

7. The system for testing output of the electrical device of claim 5, wherein the channel being tested is an audio channel, a video channel or an audio/video channel.

8. The system for testing output of the electrical device of claim 5, wherein the channel being tested utilizes High-Definition Multimedia Interface (HDMI), Digital Visual Interface (DVI), Separate Video (S-video), composite video, component video, Video Graphics Array (VGA) or stereophonic sound (stereo).

9. The system for testing output of the electrical device of claim 5, further comprising a plurality of available channels, wherein if the number of the at least one first transmission interface is more than one, the first transmission interfaces are electrically connected with the available channels respectively and the device being tested further comprises:
  a selection module, selecting one of the first transmission interfaces, and taking the available channel electrically connected with the selected first transmission interface as the channel being tested.

10. The system for testing output of the electrical device of claim 9, further comprising:
  a selection interface, being electrically connected with the selection module, wherein the test platform receives information of the taken available channel, which is taken as the channel being tested, through the selection interface, such that the second transmission interface receives the signal from the taken available channel.

11. The system for testing output of the electrical device of claim 10, wherein the selection interface utilizes Recommended Standard 232 (RS-232).

12. The system for testing output of the electrical device of claim 5, wherein the processing module is a Deinterlacer/Scaler.

13. A test platform for testing output of an electrical device, comprising:
  a plurality of transmission interfaces, wherein each of the transmission interfaces can be electrically connected with a device being tested through one of a plurality of available channels respectively;
  a selection module, receiving selection information for selecting one of the transmission interfaces, wherein the available channel, which is electrically connected with the selected transmission interface, is taken as a channel being tested, and the device being tested transmits a first signal through the channel being tested to the selected transmission interface; and
  a processing module, being electrically connected with the transmission interfaces, receiving a signal through the selected transmission interface and determining if the selected transmission interface is normal by comparing the first signal with the signal received through the selected transmission interface, wherein the selected transmission interface is determined to be normal when the first signal is the same as the signal received through the selected transmission interface,
  wherein the test platform transmits and initial signal to the device being tested, such that the device being tested starts to transmit the first signal to the test platform through the channel being tested,
  wherein when no signal was received through the channel being tested by the test platform in a period of time since the initial signal was transmitted, the test platform determines that connection between the device being tested and the channel being tested or connection between the channel being tested and the test platform is abnormal.

14. The test platform for testing output of the electrical device of claim 13, further comprising:
  a selection interface, being electrically connected with the selection module, wherein the selection module receives the selection information through the selection interface.

15. The test platform for testing output of the electrical device of claim 13, wherein the processing module is a Deinterlacer/Scaler.

* * * * *